United States Patent [19]
McIntosh et al.

[11] Patent Number: 6,148,599
[45] Date of Patent: Nov. 21, 2000

[54] PROCESS AND APPARATUS FOR GASIFYING SOLID CARBONACEOUS MATERIAL HAVING A HIGH MOISTURE CONTENT

[75] Inventors: Malcolm J McIntosh, Donvale; Sankar Bhattacharya, Clayton, both of Australia

[73] Assignee: Generation Technology Research Pty. Ltd., Mulgrave, Australia

[21] Appl. No.: 09/114,432

[22] Filed: Jul. 13, 1998

[30] Foreign Application Priority Data

Sep. 10, 1997 [AU] Australia ................................ PO9100

[51] Int. Cl.[7] .............................. F02C 13/10; F02B 43/00; F26B 19/00
[52] U.S. Cl. ............................ 60/39.02; 60/39.12; 34/86; 34/330
[58] Field of Search ................................ 60/39.02, 39.12; 34/86, 330

[56] References Cited

U.S. PATENT DOCUMENTS

| | | | |
|---|---|---|---|
| 3,309,780 | 3/1967 | Goins | 34/86 |
| 4,150,953 | 4/1979 | Woodmansee | 60/39.12 |
| 5,171,406 | 12/1992 | Shang et al. | 201/31 |
| 5,953,899 | 9/1999 | Rao et al. | 60/39.12 |

*Primary Examiner*—Charles G. Freay
*Attorney, Agent, or Firm*—Andrus, Sceales, Starke & Sawall, LLP

[57] ABSTRACT

A process and apparatus for gasifying high moisture content carbonaceous material by introducing a solid first carbonaceous material (1) into at least one pressurized drier vessel (2), the first carbonaceous material having a moisture content above about 30 wt % wet basis. The moisture content of the first carbonaceous material is reduced by passing a hot flue gas having a low oxygen content through the pressurized drier vessels. Then the dried first carbonaceous material is transferred from the drier vessels to a pressurized carbonizer vessel (10). The dried material is partially gasified in the carbonizer vessel to produce a high temperature fuel gas (18) and a solid residual material (16). The solid residual material is transferred to a pressurized combustion chamber (4) to produce the low oxygen content flue gas for the pressurized drier vessels. The fuel gas and the flue gas can be used in a topping combustor in which gases are burnt in the presence of air to produce hot turbine feed gases which are then supplied to a turbine in a combined cycle gas turbine for generating electricity. Low moisture fuels can also be effectively utilized in this process by adding water separately or with the fuel in the form of a paste or slurry.

31 Claims, 2 Drawing Sheets

PROCESS AND APPARATUS FOR GASIFYING SOLID CARBONACEOUS MATERIAL HAVING A HIGH MOISTURE CONTENT

FIELD OF THE INVENTION

This invention relates to a process and apparatus for the gasification of solid carbonaceous material with a high moisture content and particularly to a process and apparatus which integrates a means of drying the solid carbonaceous material with the gasification process.

BACKGROUND OF THE INVENTION

The use of carbonaceous materials such as coal as a fuel for the production of electrical power is widely accepted in most industrial countries. A number of the known processes involve the gasification of solid carbonaceous material with air at elevated temperatures often in the presence of steam to partially combust the carbonaceous material to produce a mixture of combustible gases. In combustion or gasification processes all of the moisture in the coal has to be dried either prior to the process in a separate drier or during the process. As drying is an energy consuming process, the efficiency of a power plant can be significantly improved by the choice of the drying process.

In recent years, a number of more advanced technologies have been developed to improve the thermal efficiency of coal fuelled power stations, reduce emission levels of $NO_x$, $SO_x$ and $CO_2$ as well as reduce the overall cost of electricity. Most of the advanced technologies that have been reported have been trialled and practiced on low moisture content carbonaceous materials such as high-rank coals which have a moisture content typically less than 10%.

Countries such as Australia, Germany, USA, China, Indonesia and India have large deposits of low-rank coals having high moisture contents which typically may exceed 60 wt % wet basis. One of the specific issues to be considered in the utilisation of high moisture carbonaceous materials for power generation is the need to incorporate a coal drying process. Other differences between high-rank coals and low-rank coals must also be considered in the design of a power generation system. Low rank coals generally have a higher alkali metal in ash content which affects fouling and corrosion and have a higher reactivity associated with a higher oxygen level and porosity, and the catalytic effect of the alkali.

In a conventional low rank coal fuelled boiler plant, raw coal is dried in direct contact with hot flue gas aspirated from the furnace by fan or beater mills. The dried pulverised coal is directed to the furnace (via the burners) entrained in the flue gas which has been cooled as a result of the drying.

A similar process has been proposed in Australian Paten No 661176 in the name of the State Electricity Commission of Victoria referred to as an Integrated Drying and Gasification Combined Cycle (IDGCC) process. In this proposal, the coal is dried in the hot fuel gas leaving the gasifier. After drying, the coal is separated from the gas in a device such as a cyclone for feeding to the gasifier. The cooled fuel gas, together with evaporated moisture, is directed via a hot gas filter to the gas turbine.

While this process has the possibility of increasing power output, due in part to the moisture evaporated from the coal being passed through the gas turbine, it operates on the assumption that the gasification of the coal is virtually 100% complete.

Another drying process which is similar in principle, has been developed as part of the IVOSDIG gasification process for wet fuels (S Hulkkonen, M Raiko, MÄijälä, Ref. High efficiency power plant processes for moist fuels. IGTI-Vol 6, 1991 ASME Cogen-Turbo Book No. 100313-1991). In this process superheated steam at a pressure slightly greater than the gasifier pressure is used to dry the fuel in a direct contact drier. The energy for drying is obtained from the cooling of the superheated drying steam. After drying the fuel is separated in a cyclone and fed to the gasifier.

After the cyclone, the part of the stream flow corresponding to the moisture evaporated from the fuel is injected into the gas stream from the gasifier for expansion through the gas turbine. The flow corresponding to the heating steam is recirculated through a super heater by a fan for reheating.

Other less integrated drying methods may also be used. In these the coal is dried at or near atmospheric pressure and then injected into the pressurised gasifier or combustor of the advanced power generation plant via lock hoppers or the like. The most commonly used driers for drying brown coal in Victoria and Europe are the rotary drum type, which are used, for example, in the making of briquettes. In these driers, coal is fed at atmospheric pressure through tubes contained in a drum or shell and the heat of drying is supplied by steam condensing on the outside of the tubes. The moisture evaporated from the coal is carried through the tubes in a low velocity air stream.

More recently another indirect steam drying process has been developed involving a steam fluidised bed drier (SFBD). In a SFBD, crushed coal is dried in a fluid bed at a pressure slightly greater than atmospheric pressure using a steam as the fluidising medium. The water evaporated from the coal adds to the fluidising steam so that the coal is contained entirely in an inert steam environment. The heat for drying is supplied to the bed through tubes by steam condensing at a pressure of typically about 5 bar.

An advanced technology for power generation from coal to have achieved essentially a commercial status is the combined cycle technology of pressurised fluid bed combustion (PFBC). The potential for further development of PFBC has been widely recognised. The performance of PFBC is limited by the maximum temperature allowed in the fluid bed (about 860° C.) which in turn controls the temperature of the gas to be expanded through the gas turbine. The gas turbine output from a PFBC system as a result is limited to about 20% of the total electrical output.

The A-PFBC (Advanced Pressurised Fluid Bed Combustion) system primarily was intended to overcome the gas turbine inlet temperature constraint of PFBC. By combining the PFBC with a gasifier, the gas turbine inlet temperature can be raised to the maximum allowable temperature which is currently around 1260° C. in modern large gas turbines. This increases the power generated from the gas turbine (Brayton cycle) to about 50% of the total electrical output. In an A-PFBC system, the coal is reacted in two stages and is referred to as a hybrid system. The coal is first partially gasified in a carboniser to produce a stream of low calorific value fuel gas and a stream of char. The char is then burned separately in a pressurised fluid bed boiler to generate steam. The low specific energy gas from the carboniser is mixed with the combustion products of the char at a temperature of about 860° C. and burned with air in a topping combustor. Both the fuel gas and the flue gas are cleaned prior to entering the topping combustor. The resulting flue gas, which is controlled by excess air so as not to exceed the allowable maximum turbine inlet temperature of currently about 1260° C., is then expanded through the gas turbine. The air supplied to the carboniser, PFBC and topping combustor is extracted from the gas turbine compressor. A booster compressor is used only for the air supplied to the carboniser. Steam is also generated in the heat recovery boiler of the gas turbine and this together with the steam from the PFBC is used to drive a steam turbine.

As discussed above, all of the advanced technologies which are presently being developed are being trialled and practiced with high-rank coals which by nature have a low moisture content. One method for adapting technologies which require low moisture coal to use with high moisture carbonaceous materials is to add a separate pre-drying step.

OBJECTIVE AND SUMMARY OF THE INVENTION

It is an object of the present invention to provide a process for gasifying high moisture content carbonaceous material which incorporates the drying step into the process and provides advantages over a process with separate predrying.

Accordingly the invention provides a process for the gasification of a solid carbonaceous material having a high moisture content including the steps of (a) introducing a solid first carbonaceous feed material into at least one pressurised drier vessel, said first carbonaceous feed material having a high moisture content, (b) reducing the moisture content of said first carbonaceous material by passing hot flue gas having a low oxygen content through said pressurised drier vessels to dry said first carbonaceous material, (c) transferring the dried first carbonaceous material from said pressurised drier vessel to a pressurised carboniser vessel, (d) partially gasifying said dried first carbonaceous material in said pressurised carboniser vessel to produce a high temperature fuel gas and a solid residual material, (e) transferring said solid residual material to a pressurised combustion chamber, and (f) combusting said solid residual material in said pressurised combustion chamber to produce said low oxygen content flue gas.

In the above described system, flue gas from the combustion of solid residual material is used to dry the solid first carbonaceous feed material. In one form of the invention, the solid residual material is combusted with a second carbonaceous material in said pressurised combustion chamber in order to control the oxygen level in the flue gas for drying the coal. For convenience it is preferable that the second carbonaceous material is from the same source as the first carbonaceous material fed to the pressurised drier vessel.

In another form of the invention, a portion of the cooled flue gas is recirculated via a compressor, to the pressurised combustion chamber as an alternative means for controlling the oxygen level in the flue gas.

As the flue gas passes through the drier vessel, the first solid carbonaceous material is dried and preferably fully entrained in the flue gas stream. The solid material entrained in the flue gas stream is subsequently separated and introduced into the pressurised carboniser vessel together with dried carbonaceous material not entrained while in the drier. The flue gas stream, which is cooled and humidified during drying of the coal, may be dehumidified in a dehumidifier and moisture separator prior to passing through a heat exchanger to cool the fuel gas.

The hot fuel gas produced as a result of the partial gasification of the dried solid first carbonaceous material in said pressurised carboniser vessel is separated from any entrained particulate material and then cooled. Many high moisture content carbonaceous fuels have high levels of volatilised alkaline material in ash, such as sodium, which results in high levels of alkaline materials being present in the hot fuel gas.

It is preferable that the fuel gas is cooled by heat exchange with the flue gas from the pressurised drier before being passed through a hot gas filter to separate any finely divided solid material from the gas stream. Upon cooling the fuel gas, the alkaline materials condense onto the finely divided solid material entrained in the gas stream and this solid material may then be removed from the gas stream prior to the gas stream being fed to the topping combustor.

In the topping combustor the fuel gas is combusted in the presence of the flue gas and air. The resulting hot turbine feed gases may then be used to produce electricity in a combined cycle gas turbine.

The invention also provides a method and apparatus for producing electricity from high moisture content carbonaceous material.

DESCRIPTION OF THE PREFERRED EMBODIMENT

Figure 1:
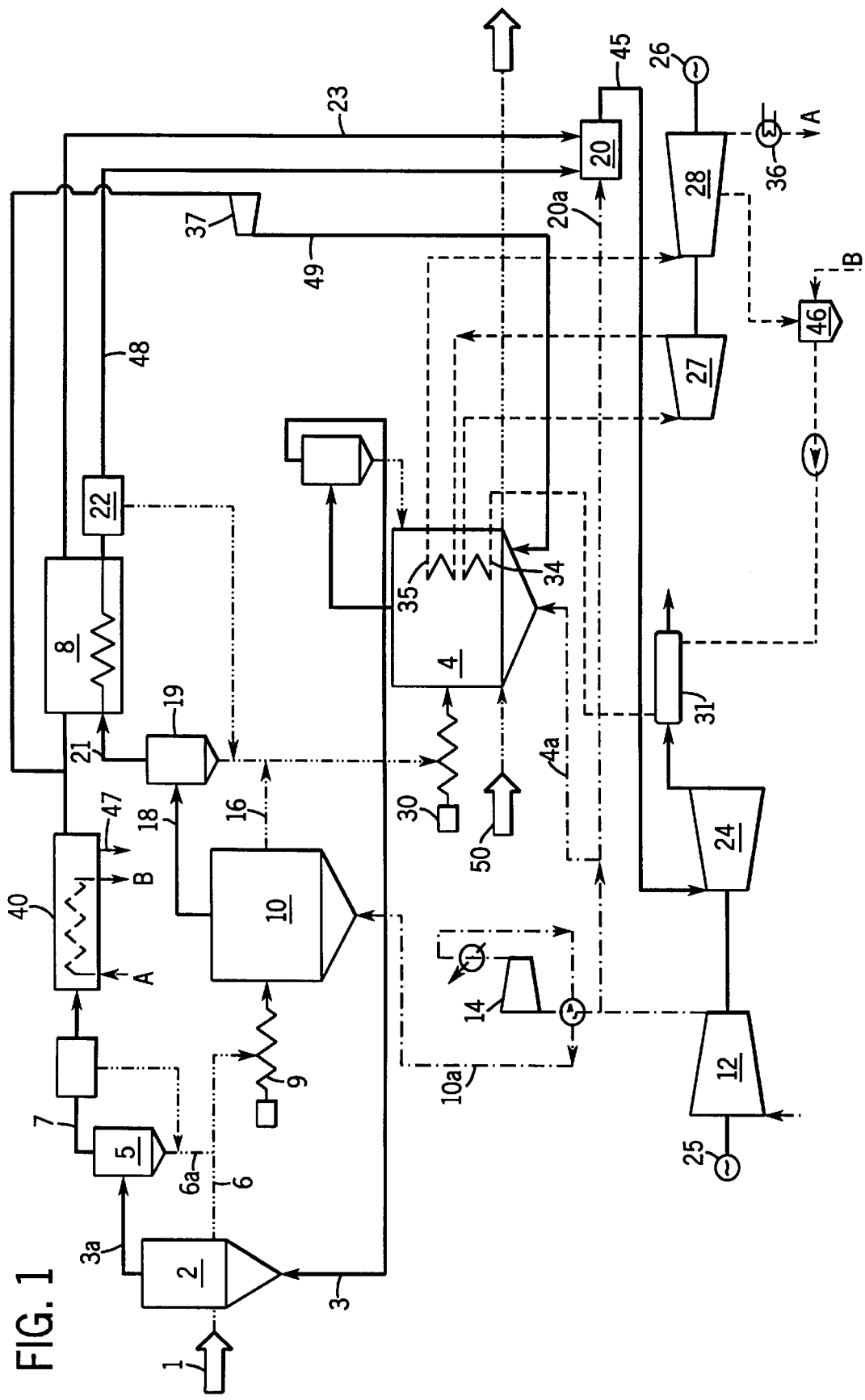
Figure 2:
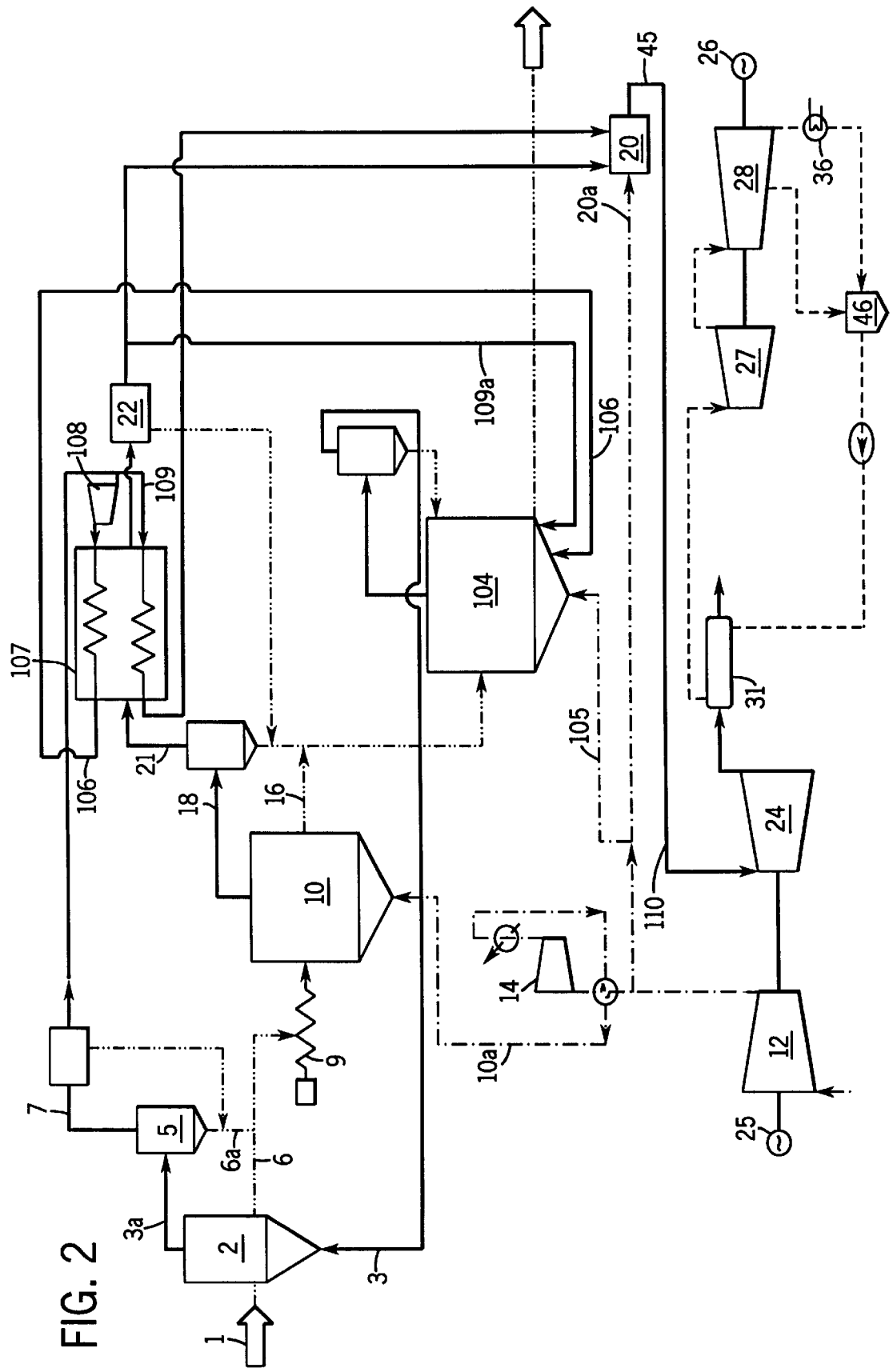

The features, objects and advantages of the present invention will become more apparent from the following description of the preferred embodiment and accompanying drawing, in which:

FIG. 1 is a schematic representation of an embodiment of the invention incorporated into a powerstation, and FIG. 2 is a schematic representation of a second embodiment of the invention incorporated into a powerstation.

DETAILED DESCRIPTION OF THE INVENTION

The invention will now be described with reference to a low rank coal having a high moisture content of 62 wt % wet basis but it would be readily apparent to a person of ordinary skill in the art that the invention is suitable for use with other carbonaceous materials such a peat, lignite, and biomass having a high moisture content above about 30 wt % wet basis. In view of the increased efficiencies and other process advantages obtained by using the invention, the process and apparatus of the invention are usable with high rank coals. While high rank coals do not have a large amount of water bonded with their structure, water may be added to the process either with the coal or separately to make up the necessary moisture content. High rank coals are often fed as a paste or slurry having a high water content and such pastes or slurries are usable with the invention. Thus it would be understood by those skilled in the art that in the context of the invention, reference to solid carbonaceous feed material having a high moisture content is intended to include not only low rank coals with a large amount of bonded water but also any low moisture content carbonaceous material including high rank coals with a low structural water content and water added separately or with the material.

Referring to FIG. 1, raw low rank or moist coal 1 is fed to a pressurised drier 2 where it is contacted with a flow of hot flue gas 3 from a combustor 4. The hot flue gas 3 preferably enters the drier at a temperature above 700° C. and preferably about 860° C. and has an oxygen content of less than nominally 10 wt % but in practice may be as low as is practicable to maintain complete combustion in the combustor to reduce the risk of the raw coal igniting once the moisture content in the coal is sufficiently reduced.

The coal in the pressurized drier 2, which is at a pressure of about 15 bar to suit the pressure developed by a typical gas turbine compressor, is dried in the flow of hot flue gas. The drier is preferably an entrained flow type or it may be a fluidised bed or other suitable type. The coal leaving the drier 2 has a moisture content nominally in the range of 12% to 20 wt % and the flue gas stream after drying the coal has a temperature of about 200° C.

After leaving the pressurised drier 2, the entrained dried coal and flue gas stream 3a then passes into a gas/solid separator 5 such as a cyclone where the dried coal 6a is separated from the cooled flue gas 7.

The flue gas in one option is passed through a dehumidifier and moisture separator 40 before being transferred to fuel gas cooler 8. The flue gas may be dehumidified, for example, by cooling the gas stream with condensate A from the steam turbine in a heat exchanger. The heat thus extracted is usefully utilised for heating feed water B. The gas temperature that can be achieved at the turbine inlet is thus increased and the cycle efficiency is greater than can be obtained without dehumidification. Also, with dehumidification, the mass flow through the turbine rotor in excess of the mass flow of air supplied by the turbine compressor, due to moisture evaporated from the coal, can be controlled to avoid limitations imposed by compressor surge considerations.

In general, any additional mass flow through the turbine rotor over the mass flow of air supplied from the turbine compressor has a very beneficial effect on gas turbine performance. Assuming that gas turbines are available with adequate surge margins, there may be advantages in a system without dehumidification and hence operating at lower turbine inlet temperatures because the efficiency penalty incurred is likely to be small. These advantages relate to avoiding the complexities associated with the collection and treatment of the water condensed from the flue gas.

The dried coal 6a leaving the gas/solid separator 5 is then admitted to a pressurised carboniser 10 via a screw feeder 9 or suitable solid feeder. The carboniser 10 is an air blown fluidised bed gasifier which is fluidised with pressurised air 10a produced by turbine compressor 12 and booster compressor 14. Air is drawn from the atmosphere into compressor 12 and then passed to booster compressor 14 to bring the air to the required pressure before passing through ducting to the carboniser 10. The pressure in the carboniser may vary from slightly greater then the pressure developed by the turbine compressor to, say, 10 bar greater. The oxygen in the air partially combusts the dried coal in the carboniser 10 to provide the heat for gasification to produce a hot fuel gas 18 and a solid residual char 16.

There are two output streams from the carboniser, namely the fuel gas 18 at a temperature typically in the range of 700° C. to 1000° C. and char 16. The proportioning of fuel gas (including any tars) and char will be a function of the coal type and carboniser conditions. The degree of gasification in the carboniser 10 is dependent on such factors as temperature in the carboniser, residence time for the solid material and the gasification agent. The expected char yield may be typically in the range of 5 wt % to 40 wt %. However, since the energy content of the fuel gas 18 is dependent on the char yield, the carboniser char yield should be controlled and adjusted in consideration of the energy requirements of the fuel gas 18 to achieve a high gas turbine inlet temperature.

The char 16 is removed from the carboniser 10 and fed to the combustor 4 in a screw feeder 30 or suitable solid feeder.

The combustor 4 is preferably a pressurised fluid bed combustor which is fluidised by air 4a supplied by compressor 12.

The oxygen level in the flue gas 3 to be supplied to the driver 2 should be controlled to a sufficiently low level to avoid the possibility of an explosion and thereby ensure safe operation of the drier. The oxygen level is to be maintained below a level of less than nominally 10 wt % but in practice may be as low as practicable to maintain complete combustion in the combustor. The oxygen level of the flue gas 3 is able to be independently controlled by the admission of carbonaceous material 50 directly into the combustor 4. Carbonaceous material 50 which is preferably the same high moisture content carbonaceous material fed into pressurised drier 2 may be supplied to the combustor 4. Alternatively, cooled flue gas 49 can be recirculated by recirculation compressor 37 to the inlet of the combustor which will result in a higher cycle efficiency. The potential of the flue gas to dry the carbonaceous material in the drier is dependent on the mass flow, and the temperature and humidity of the flue gas entering combustor 4.

The fuel gas 18 from the carboniser 10 is passed into a gas/solid separator 19 and cooled by the flue gas to a temperature nominally below 600° C. The flue gas 21 is then cooled either by indirect cooling in a heat exchanger 8 or by direct mixing with flue gas 7. Since direct mixing has the effect of diluting the fuel gas and potentially reducing the calorific value of the gas mixture below a level which is able to provide stable combustion in a topping combustor 20, indirect cooling in a heat exchanger 8 is preferred.

At a temperature below about nominally 600° C., the volatilised alkali metals such as sodium are condensed from the fuel gas stream 21 and collect on the entrained ash particles for removal with the particulates in a hot gas filter 22. The alkali concentration in the resulting cooled fuel gas 48 is expected to be below the currently acceptable limit of 24 ppb.

The applicants have found in tests with Latrobe Valley brown coal, that the proportion of alkali metals volatilised during carbonisation in the carboniser 10 is a strong function of the temperature in the carboniser and that the majority of the alkali metals are retained in the char 16 when the coal is carbonised at temperatures below about 850° C.

The tests also indicated that the majority of the chlorine is released (presumably as hydrogen chloride) at a temperature below 400° C. The alkali in the char 16 when burnt in the combustor 4 is likely to form sulphates or combine with the bed material to form silicates rather than be volatilised as a chloride. Therefore, the release of volatile alkali species from the bed in combustor 4 would be expected to be reduced and the non-volatile species removed with removal of the bed material. Any volatilised alkali in the flue gas 3 however will be captured in the drier 2 as the flue gas is cooled from about 860° C. to about 200° C.

After passing through the hot gas filter 22, the fuel gas 48 is passed to a topping combustor 20 where the fuel gas is combusted in the presence of the flue gas 23 and air 20a supplied by compressor 12. The hot turbine feed gases 45 are then used to drive the rotor of the gas turbine 24 which generates electric power through generator 25 and the gas turbine powers compressor 12.

If the stoichiometric combustion temperature in the topping combustor 20 is less than the allowable maximum turbine inlet temperature (as is the case for a moisture content of 62 wt %), then the efficiency of the power generation can be marginally improved either by:

Reducing the moisture content of the flue gas 7 after the drier (dehumidifier and moisture separator). As discussed earlier this can be accomplished by heat exchange with the condensate from the condenser in a heat exchanger 40, or Partly or fully drying the raw coal fed to the combustor 4 in an efficient way and thereby reducing the moisture content of the flue gas 3 fed to the pressurised drier 2.

A heat recovery circuit is arranged to operate in conjunction with the combustor to drive high pressure steam turbine 27 and intermediate/low pressure steam turbine 28. In one embodiment, the heat from the exhaust of gas turbine 24 is used to heat circulating feed water B in an economiser 31. Steam raising and superheating of the steam to drive the high pressure steam turbine 27 is accomplished in a first heating stage 34 in the combustor 4 and reheating of the steam to drive the intermediate/low pressure steam turbine is carried out in a second heating stage 35 in the combustor 4.

The high pressure steam turbine 27 is coupled to an intermediate/low pressure steam turbine 28 to generate electrical power through generator 26.

The steam from the intermediate/low pressure steam turbine is condensed in condenser 36 and the condensate A fed to dehumidifier and moisture separator 40. As discussed earlier, the condensate A may be used to cool and condense moisture 47 from the flue gas stream 7. The heated condensate B may be returned to the feed via deaerator 46.

For high moisture coals (moisture content more than about 55 wt % wet basis) the stoichiometric combustion temperature in the topping combustor 20 will be less than the maximum allowable turbine inlet temperature, resulting in an efficiency less than the capability of the gas turbine. This reduction, however, is largely compensated by the increased output and hence efficiency due to the evaporated coal water being expanded through the turbine. In more advanced gas turbines under development, steam cooling or the use of ceramic blading, will result in more of the air of the gas turbine compressor being available for combustion, as the air for cooling and sealing the gas turbine bypasses the combustor.

The estimated performance of the A-PFBC fed with raw coal is as follows assuming the use of a supercritical steam cycle.

A further embodiment that, where applicable, offers potentially significant advantages is shown in FIG. 2. Where equipment identical to the embodiment of FIG. 1 is referenced, the numbering and description in regard to FIG. 1 is the same. This embodiment is applicable, in particular, for carbonaceous materials for which there has been a high carbon conversion in the carboniser and which have a high moisture content. In this embodiment, the heat liberated from burning the char 16 in the pressurised combustor 104 is used only to generate hot flue gas 3 which in turn dries the feed coal 1. The input streams to the pressurised fluid bed combustor 104 are char 16, combustion air 108 and recirculated flue gas 106 obtained from downstream of the drier 2 and the flue gas cooler 107. The temperature of the flue gas would be controlled to about 860° C. and the mass flow would be adjusted by controlling the flow of recirculated flue gas via compressor 108. If there is insufficient heat generated from the combustion of the char, the balance can be provided by diverting a stream 109a of fuel gas from the carboniser stream 21 and burning this with the char 16 in the pressurised combustor 104. For the example of a Latrobe Valley coal with a moisture content of 62% wet basis, a char yield of approximately 13.5% by weight of dried coal would provide sufficient heat to dry the coal to a moisture content of 20%.

In this embodiment there is no fluid bed boiler (34, 35 in FIG. 1) to generate steam for power production. This means that the heat generated from the combustion of the char 16 must not exceed the heat required for drying, otherwise the excess heat must be removed using boiler heat transfer surface installed in the pressurised fluid bed combustor.

The fuel gas cooler 107 is arranged with the fuel gas 21 and flue gas 106, 109 in counter-flow, which enables the fuel gas 21 to be cooled from a temperature of about 860° C. to a relatively low temperature of about 350° C., by heat exchange with the flue gas 106, 109 from the drier 2 at about 180° C. A control valve (not shown) in the fuel gas line 21 can therefore be used to effect control of a gas turbine. Because of temperature considerations, the compressor 108 for recirculating part of the flue gas 106 to pressurised combustor 104 can be positioned upstream of the fuel gas cooler 107 where the gas temperature is low.

This arrangement is more efficient than the other embodiment as the whole of the power is generated from a high

| Oxygen Control by: | | Second Coal Feed to Combustor | Recirculated Cooled Flue gas to Combustor |
|---|---|---|---|
| Coal moisture content | % wet basis | 62 | 62 |
| Coal flow to the drier | Tonne/hr | 273 | 273 |
| Char flow to PFBC | % Carboniser dry coal | 31.5 | 31.5 |
| Coal flow to PFBC | Tonne/hr | 30 | 0 |
| Recirculated flue gas | % Drier flue gas | 0 | 19 |
| Topping combustor exit temp. | ° C. | 1165 | 1256 |
| Flue gas across cooler | ° C. | 180 to 340 | 180 to 380 |
| Flue gas across cooler | ° C. | 860 to 550 | 860 to 550 |
| Gas turbine output | MW | 171 | 172 |
| Steam turbine output | MW | 222 | 193 |
| Auxiliary power | MW | 27 | 27 |
| Efficiency | % | 43.3 | 44.4 | efficiency combined cycle gas turbine, i.e. a gas turbine and its associated waste heat boiler and steam turbine. This compares with a combination of combined cycle gas turbine and high pressure steam cycle from the embodiment of FIG. 1. Also, because all of the energy in the coal is used to generate flue gas 110 from topping combustor 20 for expansion through the turbine, the maximum gas temperature achievable is higher than in the systems that transfer part of the coal energy to steam in a pressurised fluid bed boiler 104. This can be important for high moisture coals as the maximum temperature that can be achieved at close to stoichiometric conditions may be less than the allowable turbine inlet temperature.

Because of the high efficiency, this process is also applicable to lower moisture content coals including high rank coals and other carbonaceous materials which may have added water. Water may be added to these materials for example to produce a past or slurry which may be fed directly into the pressurised drier 2. Such direct feeding systems are in use in some current gasifier and PFBC systems.

As discussed earlier, one of the problems previously encountered using high moisture content carbonaceous materials is the need to include a separate predrying step and the removal of alkali metal species which are more prevalent in high moisture content carbonaceous materials such as brown coal than in high rank coals such as bituminous coal. The present invention provides an integrated process for the drying and gasification of high moisture content solid carbonaceous material and the combustion of the char residue which results in very high carbon conversion and a high efficiency when compared to other processes which use high moisture carbonaceous materials.

In particular the invention provides the following advantages for high moisture fuels:

very high cycle efficiency simple drying system integrated with the plant complete drying of the coal without the need for a pre-drying step independent control of the oxygen level in the flue gas Furthermore, the present invention is able to utilise the drying process to condense the alkali species volatilised during combustion and gasification of the high moisture content solid carbonaceous material.

Also the relatively low fuel and flue gas temperatures reduce the thermal stresses imposed on the filter elements of the elements of the gas filters.

In addition, because of the low fuel gas temperatures possible, the present invention may allow the use of a turbine control valve (not shown) immediately upstream of the topping combustor 20. Although this will require operation of the carboniser only at a higher pressure, it provides direct and more immediate control of the gas turbine 24.

Furthermore in the preferred arrangement there is no requirement for:

collection and treatment of any dirty condensates from the fuel gas steam cooling in the gas ducting to reduce gas temperatures, or boiler heat transfer surface, provided the heat required for drying is arranged to be greater than or equal to the heat generated from burning the char.

Overall, the present invention provides the opportunity and potential for producing power plants with lower capital costs.

Furthermore because of the advantages described for high moisture fuels, these process advantages may also be obtained for other carbonaceous material with a low moisture content including high rank fuels by adding water separately or with the fuel. This may mean adjustment of the carboniser conditions to achieve the desired level of carbon conversion.

What is claimed is:

1. A process for the gasification of a solid carbonaceous material having a high moisture content including the steps of:

(a) introducing a solid first carbonaceous feed material into at least one pressurised drier vessel, said first carbonaceous feed material having a high moisture content above about 30 wt % wet basis, (b) reducing the moisture content of said first carbonaceous feed material by passing hot flue gas having a low oxygen content through said pressurised drier vessel to dry said first carbonaceous feed material, (c) transferring the dried first carbonaceous feed material from said pressurised drier vessel to a pressurised carboniser vessel, (d) partially gasifying said dried first carbonaceous feed material in said pressurised carboniser vessel to produce a high temperature fuel gas stream and a solid residual material, (e) transferring said solid residual material to a pressurised combustion chamber, and (f) combusting said solid residual material in said pressurised combustion chamber to produce said low oxygen content flue gas stream.

2. The process according to claim 1 wherein finely divided solids are entrained in said fuel gas stream produced in step (d).

3. The process of claim 2 wherein the fuel gas stream is cooled to condense alkaline material onto said finely divided solids, the finely divided solids being then separated from said fuel gas stream to produce a substantially alkaline free fuel gas.

4. The process of claim 3 wherein the fuel gas stream is cooled by heat exchange with said flue gas stream from the pressurized drier.

5. The process of claim 1 wherein the fuel gas stream is cooled by heat exchange with said flue gas stream from the pressurised drier.

6. The process of claim 5 wherein the flue gas is dehumidified prior to being heated by heat exchange with said fuel gas from said pressurised carboniser vessel.

7. The process of claim 6 wherein a portion of the dehumidified flue gas stream from the drier vessel is admitted to said pressurised combustion chamber.

8. The process of claim 5 wherein a portion of said cooled fuel gas is combusted in said pressurised combustion vessel.

9. The process of claim 5 wherein the solid residual material is combusted in said pressurized combustion chamber with a second carbonaceous material.

10. The process according to claim 5 wherein the first carbonaceous feed material is entrained with said flue gas stream from said pressurized drier vessel, subsequently separated from said flue gas and introduced into the pressurized carboniser vessel.

11. The process according to claim 1 wherein the solid residual material is combusted in said pressurised combustion chamber with a second carbonaceous material.

12. The process according to claim 11 wherein the second carbonaceous material is from the same source as the first carbonaceous feed material feed to the pressurised drier vessel.

13. The process according to claim 1 wherein the first carbonaceous feed material is entrained with said flue gas stream from said pressurised drier vessel, subsequently separated from said flue gas and introduced into the pressurised carboniser vessel.

14. The process according to claim 1 wherein the fuel gas and flue gas are combusted in the presence of air in a topping combustor to produce hot turbine feed gases.

15. The process of claim 1 wherein the moisture content of the solid carbonaceous feed material is bound within said material.

16. A method of producing electricity from a solid carbonaceous feed material having a high moisture content including the steps of (a) introducing a solid first carbonaceous material into at least one pressurised drier vessel, said first carbonaceous feed material having a high moisture content above about 30 wt % wet basis, (b) reducing the moisture content of said first carbonaceous feed material by passing hot flue gas having a low oxygen content through said pressurised drier vessel to dry said first carbonaceous material, (c) transferring the dried first carbonaceous material from said pressurised drier vessels to a pressurised carboniser vessel, (d) partially gasifying said dried first carbonaceous material in said pressurised carboniser vessel to produce a high temperature fuel gas stream and a solid residual material, (e) transferring said solid residual material to a pressurised combustion chamber, (f) combusting said solid residual material in said pressurised combustion chamber to produce said low oxygen content flue gas, (g) transferring said flue gas and said fuel gas to a topping combustor, (h) combusting said flue gas and said fuel gas in the presence of air in said topping combustor to produce turbine feed gases, and (i) using the turbine feed gases to drive the rotor of a gas turbine to convert the energy of the turbine feed gases to electrical energy.

17. The method of producing electricity according to claim 16 wherein finely divided solids are entrained in said fuel gas stream produced in step (d).

18. The method according to claim 17 wherein the fuel gas stream is cooled to condense alkaline material onto said finely divided solids, the finely divided solids then being separated to produce a fuel gas stream substantially free of alkaline material.

19. The method according to claim 13 wherein the fuel gas stream is cooled by heat exchange with the flue gas from the pressurised drier vessel.

20. The method of claim 19 wherein a portion of said cooled fuel gas is combusted in said pressurised combustion chamber to produce flue gas for said drier vessel.

21. The method according to claim 19 wherein the solid residual material of step (d) is combusted in said pressurized combustion chamber with a second carbonaceous material.

22. The method according to claim 16 wherein the solid residual material of step (d) is combusted in said pressurised combustion chamber with a second carbonaceous material.

23. The method according to claim 22 wherein the second carbonaceous material is from the same source as the first carbonaceous feed material feed to the pressurised drier vessels.

24. The method of claim 16 wherein the flue gas is dehumidified prior to being heated by heat exchange with said fuel gas from said pressurised carboniser vessel.

25. The method of claim 16 wherein a portion of the flue gas stream from said pressurised drier vessel is admitted in said pressurised combustion chamber.

26. The method of claim 16 wherein the moisture content of said solid carbonaceous feed material is bound within said material.

27. An apparatus for gasifying a solid carbonaceous material having a high moisture content including (a) at least one pressurised drier vessel for drying a solid first carbonaceous feed material, the first carbonaceous feed material when introduced to said drier having a moisture content of more than 30 wt % on a wet basis, (b) a pressurised carboniser vessel for receiving dried first carbonaceous feed material from said pressurised drier vessels, said first carbonaceous material being partially gasified in said pressure carboniser vessel to produce a high temperature fuel gas and a solid residual material, (c) a pressurised combustion chamber communicating with said carboniser vessel for receiving and combusting said solid residual material in the presence of air to produce a low oxygen content flue gas, said combustion chamber supplying flue gas to said at least one pressurised drier vessel to dry said first carbonaceous feed material, (d) a heat exchanger for transferring heat from said fuel gas to said flue gas, (e) a topping combustor for combusting said flue gas and fuel gas in the presence of air to produce turbine feed gases.

28. The apparatus according to claim 27 further including a dehumidifier and moisture separator for dehumidifying said flue gas from said at least one pressurised drier vessel, the dehumidified flue gas passing from said dehumidifier and moisture separator to said heat exchanger.

29. The apparatus according to claim 28 further including a gas/solids separator said separator removing finely divided solids entrained in said fuel gas leaving said heat exchanger prior to the fuel gas entering the topping combustor.

30. The apparatus according to claim 27 further including a gas/solids separator said separator removing finely divided solids entrained in said fuel gas leaving said heat exchanger prior to the fuel gas entering the topping combustor.

31. An apparatus for producing electricity including an apparatus for gasifying a solid carbonaceous material having a high moisture content above about 30 wt % wet basis according to claim 27 and a combined cycle gas turbine for receiving said turbine feed gases and converting the energy of said feed gases to electrical energy.

* * * * *